United States Patent [19]

McCollister et al.

[11] 4,273,826

[45] Jun. 16, 1981

[54] PROCESS OF MAKING GLASS ARTICLES HAVING ANTIREFLECTIVE COATINGS AND PRODUCT

[75] Inventors: Howard L. McCollister, Albuquerque, N. Mex.; Norman L. Boling, Santa Rosa, Calif.

[73] Assignee: Owens-Illinois, Inc., Toledo, Ohio

[21] Appl. No.: 99,452

[22] Filed: Dec. 3, 1979

[51] Int. Cl.³ .................... B32B 3/26; B32B 5/18; C03C 15/00; C03C 17/02
[52] U.S. Cl. .................... 428/304; 65/30 R; 65/31; 65/65; 350/413; 427/162; 427/168; 428/210; 428/334; 428/335; 428/336
[58] Field of Search .......... 65/30 R, 31, 60 D; 427/165, 168, 240; 350/175.6 N; 428/210, 304, 334–336

[56] References Cited

U.S. PATENT DOCUMENTS

| | | | |
|---|---|---|---|
| 3,984,608 | 10/1976 | Opitz | 65/60 D |
| 4,019,884 | 4/1977 | Elmer et al. | 65/30 R |
| 4,086,074 | 4/1978 | Minot et al. | 65/31 |
| 4,128,303 | 12/1978 | Onoki et al. | 427/165 X |
| 4,168,332 | 9/1979 | Leinen | 427/168 X |

*Primary Examiner*—Michael S. Marcus
*Attorney, Agent, or Firm*—Charles S. Lynch; Myron E. Click; David H. Wilson

[57] ABSTRACT

Disclosed is a process of making a glass article containing a thin surface film antireflective coating made by providing a dispersion containing at least one metalloorganic compound in solution, depositing a thin coating of such dispersion on the glass substrate, heating the film to drive off the solvent and to decompose the organic components, thus forming a glass film from the remaining inorganic oxide components, further heating the glass film layer to cause phase separation thereof, and thereafter etching and leaching such film to dissolve out preferentially one of the phases of the phase-separated glass, leaving a skeletonized surface film having a graded refractive index; and products resulting from such process.

10 Claims, No Drawings

PROCESS OF MAKING GLASS ARTICLES HAVING ANTIREFLECTIVE COATINGS AND PRODUCT

This invention relates to a process of making a glass article containing a thin surface film antireflective coating made by providing a dispersion containing at least one metallo-organic compound in solution, depositing a thin coating of such dispersion on the glass substrate, heating the film to drive off the solvent and to decompose the organic components, thus forming a glass film from the remaining inorganic oxide components, further heating the glass film layer to cause phase separation therein, and thereafter etching and leaching such film to dissolve out preferentially one of the phases of the phase separated glass, leaving a skeletonized surface film having a graded refractive index.

Antireflective coatings are often applied to or formed on surfaces of glass articles such as windows, display cases, optical filters, optical lenses, and glass envelopes for collectors of solar energy to convert such energy to either heat or electricity.

In some of the foregoing applications, the main advantage is the lack of glare, and in others the important factor is the elimination or minimization of reflection losses which occur at each surface of a glass article.

As is well known, such losses are about four percent at each surface of a glass article, at least for an average glass having a refractive index of about 1.5 and for light incident on the surface at angles of less than about 40° to 50° from the normal. In the past and at present as well, vacuum deposition methods have been employed to deposit antireflective coatings on glass surfaces, particularly for optical purposes. There are a number of limitations to such processes, including the disadvantage of high cost and the difficulty in coating glass articles of complex configuration.

It has also been known to provide antireflective surfaces on articles made from certain glasses, by leaching the more readily dissolvable components, using etchant solutions and methods whereby the mole soluble components are removed, leaving a skeletonized silica layer having an effective refractive index lower than that of the main bulk of the glass. Examples are the processes in U.S. Pat. Nos. 2,348,704, 2,486,431 and 2,490,662. In general, such etched coatings resulted in surface films of low abrasion resistance, low weatherability and poor chemical durability. Furthermore, they were not applicable to produce effective antireflective surface films on such difficultly-etched glasses as borosilicates. Moreover, in such processes there is little control over the pore volume obtained.

More recently, it has been suggested that the glass articles in question be formed from phase-separable glasses. See U.S. Pat. Nos. 4,019,884 and 4,086,074. In the latter patent in the paragraph common to columns 3 and 4 are cited references to a large number of glasses which will develop at least two phases of different solubility in a given etchant when subjected to a controlled heat treatment.

A disadvantage of processes such as are disclosed in the last two named patents is that one is severely limited in the glasses that can be employed. This is a particular disadvantage in many cases, such as in the formation of lenses or other optical components. Moreover, the glasses for such articles must be chosen essentially without regard to cost because one must first choose a glass that will in fact phase separate. For the same reason, the relevant optical and physical properties of the base glass must be secondary; thus, the composition of the base glass is severely limited by the requirement that it be capable of phase separation on heat treatment.

In Physics of Thin Films, Hass and Thun, editors, Vol. 5, Academic Press, New York and London 1969, pages 120-121, there is disclosed the deposition of a layer from alkali silicate solutions (the specific alkalis not identified), and eliminating alkali from the film by water, so that a highly porous $SiO_2$ skeleton with a refractive index of approximately 1.3 remains. The coating is said to be an antireflective coating, but it is technically inferior because it has little strength or abrasion resistance.

It is an object of the present invention to provide a method of producing a glass article having an antireflective coating derived from a glass film applied to such article.

It is a further object of the present invention to provide a process for making a glass article with an antireflective coating which process overcomes many or all of the disadvantages and difficulties of the prior art.

It is another object of the invention to provide a process for making a glass article having an antireflective coating, which process is much more flexible than prior art processes.

It is a further object to provide a new product which is the result of the process of the present invention.

Other objects, as well as aspects and disadvantages, of the present invention will become apparent from a study of the accompanying specification and the claims.

According to the present invention, there is provided a process of making a glass article containing a thin surface film antireflective coating, which comprises (1) providing a dispersion of organic derivatives of more than one inorganic cation, said dispersion containing at least one metallo-organic compound in solution in a liquid solvent, the components of said dispersion being capable of decomposition and reaction together under the influence of heat to form an inorganic oxide glass capable of phase separation into two immiscible phases on further heating, (2) depositing a thin coating of such dispersion on the glass article, heating the coating to drive off the solvent and to decompose the organic components, thus forming a glass film layer from the remaining inorganic oxide components, further heating the glass film layer to cause phase separation thereof into two immiscible phases, and thereafter etching and leaching such film to dissolve out preferentially one of the phases of the phase separated glass, leaving a skeletonized surface film having a graded refractive index.

Besides the clear advantages of being able to coat any glass, not just phase-separable glass, mentioned hereinbefore, it is also highly advantageous that the base glass article, such as a lens or an optical flat, can be abrasively polished, then coated and treated according to the foregoing process. Such a process is a special aspect of the present invention. The advantage is that scratches and or pits caused by the polishing are healed by the coating supplied according to the present invention.

The thickness of the phase-separated glass coating of the present process is less than 0.5 mm. There is usually little point, however, in making the coating anywhere near as thick as 0.5 mm. Thus, the coating is usually less than 0.1 mm and is in fact almost always less than one micron.

The result of the leaching of the coating from the surface is to make a graded antireflective coating; thus, a greater portion of the leachable phase is leached from the surface and less and less is leached as the leaching proceeds inwardly from the surface, so that the effective refractive index (the composite effective index of the glass and the air or voids left as a result of the leaching) gradually increases from the surface inwardly. As a practical matter, also, it may be mentioned that the thickness of the leached layer is less than the total thickness of the phase-separable coating. In such event the glass that contacts the base glass article has the effective index of refraction of the unleached phase-separated glass. If this index of refraction is effectively the same as the index of refraction of the base glass, there will be no reflection losses at the interface. Even if there is a mismatch between the index of refraction of the phase-separated glass which contacts the base glass of a different index of refraction, those skilled in the art will understand that the reflection loss at such interface will always be relatively small, compared to the reflection losses between air, having an index of refraction of about one, and the base glass, when the base glass is uncoated. This follows clearly from the formula for calculating the reflection at the interface between two materials.

In general, the pores resulting from etching and leaching phase-separated glasses are in the range from 50 to 500 angstroms across. With incident electromagnetic radiation of 2000 angstroms and above, the effective refractive index is intermediate that of the glass of the skeletonized film and of the voids. Furthermore, with the most usual very thin coating of less than one micron, there is no significant scattering of such electromagnetic radiation.

The leached portion of the coating is generally thinner than the coating and is usually in any event less than 1 micron in depth but more than 800 angstroms.

While it has been pointed out that one great advantage of the present process is that one is not limited as to what base glasses can be treated to form a phase-separable glass coating thereon from solution, which coating is phase-separated and etched and leached to form the antireflective coating, it is, however, obvious that in most cases the phase-separation temperature of the glass of the coating must be below the fiber softening point of the base glass article, in order to avoid deforming the base glass article during the phase-separation heat treatment. Of course, such phase-separation heat treatment might take place in special instances somewhat above the fiber softening point of the base glass of the article such as when the base glass article can be fully supported during heat treatments so that it will not become misshapen.

The following examples of the process of the invention and the resulting products are merely illustrative.

EXAMPLE 1

Tetraethyl silicate (24.5 g) was mixed with methoxyethanol (25 g) and 1 N nitric acid solution (2.4 g) was added. The resulting solution was heated to approximately 60° C. and then allowed to cool to room temperature. Aluminum tri-sec-butoxide (3.1 g) was added and the mixture stirred until a clear solution was obtained.

Calcium nitrate tetrahydrate (4.6 g), sodium nitrate (1.1 g) and magnesium basic carbonate (1.8 g) were dissolved in water (20 g) and concentrated nitric acid (10 g). The solution was then added to the aluminosilicate solution and the resulting solution made up to a total weight of 200 g with isopropanol.

The product contained the equivalent of 10 g total oxides in 200 g total.

The composition of the above solution was such that, when heated to drive off volatiles and decompose the organic portions, the resulting glass composition is as follows:

| COMPONENT | PARTS BY WEIGHT |
| --- | --- |
| $SiO_2$ | 70 |
| $Al_2O_3$ | 6.4 |
| CaO | 10.9 |
| MgO | 7.8 |
| $Na_2O$ | 3.9 |

One fourth of a 2.5" disc, 1.7 mm. thick of polished, fused silica was spin coated on a turntable with 6 drops of the foregoing dispersion. The spinning spread an even coat of the solution over the surface. After the coating was dry to the touch, the second side was coated in the same manner. The coated sample was then dried for 15 min. at 85° C., and the coating consolidated by heating for 20 min. at 300° C. Then phase separation was effected by heating one hour at 750° C. to form a phase-separated glass film well under 1 micron thick.

Both sides of the sample were etched by immersing for two minutes in a solution containing 1.2 ml of a 47 weight percent solution of HF in water, 7.6 ml of a 37 weight percent of HCl in water and 112 ml of alcohol consisting of 90.2 weight percent ethanol, 4.8 weight percent methanol, and 5 weight percent isopropanol. Then the sample was rinsed in water with ultrasonic agitation. The etched and leached sample was then air dried under a heat lamp, leaving a porous coating on each side. The etched and leached portion was about ¼ micron thick and the porosity was highest at the surface, gradually decreasing away from the surface. The pore size of the voids nearest the surface was about 100–200 Å across.

The transmission of the silica and of the sample containing the phase separated, etched and leached coating for various wavelengths was run on a Cary 14 spectrophotometer. Results were as follows:

| FUSED SILICA | | | | | | | | | | |
| --- | --- | --- | --- | --- | --- | --- | --- | --- | --- | --- |
| λ, nm | 2000 | 1500 | 1200 | | | | | 700 | | 400 |
| % Transmission | 93.5 | 94 | 94 | | | | | 93.2 | | 92 |
| COATED SAMPLE | | | | | | | | | | |
| λ, nm | 2000 | 1500 | 1100 | 1000 | 900 | 800 | 700 | 600 | 500 | 400 |
| % Transmission | 95 | 96 | 96.8 | 97.8 | 98.2 | 99 | 99.5 | 99.9 | 97 | 96.5 |

A two inch glass disc, 2 mm thick, having the following composition was prepared and polished:

| COMPONENT | PARTS BY WEIGHT |
| --- | --- |
| $SiO_2$ | 70 |
| MgO | 7.8 |
| $Na_2O$ | 3.9 |
| CaO | 10.9 |
| $Al_2O_3$ | 6.4 |
| $Sb_2O_3$ | 0.3 |

It was spin coated on one side with ten drops of the dispersion described in Example 1. It was dried for 10 minutes at 85° C. and the coating consolidated by heating for 30 minutes at 300° C., and then the resulting glass film was phase separated by heating for 1 hour at 750° C. to form a phase-separated glass. The coating was much less than 1 micron thick.

Another, control disc was treated the same way, but without any coating applied.

Both sides of the coated sample were etched by immersing for 4 minutes in a solution containing 1.2 ml of a 47 weight percent solution of HF in water, 7.6 ml of a 37 weight percent of HCl in water and 112 ml of alcohol consisting of 90.2 weight percent ethanol, 4.8 weight percent methanol and 5 weight percent isopropanol. Then the sample was rinsed in water with ultrasonic agitation. The etched and leached sample was then air dried under a heat lamp leaving a porous coating on each side.

The transmission of the control disc and of the sample containing the phase separated, etched and leached coating for various wavelengths was run on a Cary 14 spectrophotometer. Results were as follows:

| CONTROL SAMPLE | | | | | |
| --- | --- | --- | --- | --- | --- |
| λ, nm | 1200 | 1100 | 900 | 800 | 700 |
| % Transmission | 90.6 | 90.3 | 91.2 | 90.3 | 90.3 |
| COATED SAMPLE (coated on one side) | | | | | |
| λ, nm | 1200 | 1000 | | | 600 |
| % Transmission | 97. | 98. | 98.5 | | 96. |

The base glass also phase separated at 750° C. and was etched and leached, so that the uncoated side was also antireflective. This example is an illustration of using the present process even on a base glass that is phase separable. Thus, the base glass on polishing can contain scratches, but the solution applied coating heals such scratches. Since it is very thin and follows the figure of the base glass, the base glass need not be polished, eliminating external scratches.

EXAMPLE 3

A polished 2"×1.5" wafer, ⅛ inch thick, of a Faraday rotation glass of Hoya Optics U.S.A., Inc., known as FR-5, was coated similarly to Example 1. FR-5 is a terbium borosilicate glass having a high index of refraction of about 1.68. On the first side were spin coated 32 drops of the same solution used in Example 1. The coated sample was then dried for 10 minutes at 85° C., the coating consolidated by heating for 15–20 minutes at 300° C., and the resulting glass film phase separated by heating the composite for 1 hour at 750° C. The sample cracked on removing from the furnace. On the other side of a smaller portion of the sample was spin coated 13 drops of the same solution and the heat treatment was repeated as before; thus, the first side received 2 hours phase separation heating at 750° C. The coating on each side was less than 1 micron thick.

Both sides of the sample were etched by immersing for 2 minutes in a solution containing 1.2 ml of a 47 weight percent solution of HF in water, 7.6 ml of a 37 weight percent of HCl in water and 112 ml of alcohol consisting of 90.2 weight percent ethanol, 4.8 weight percent methanol and 5 weight percent isopropanol. Then the sample was rinsed in water with ultrasonic agitation. The etched and leached sample was then dried as before, leaving a porous coating on each side.

The transmission of the FR-5 control and of the sample containing the phase separated, etched and leached coating for various wavelengths was run on a Cary 14 spectrophotometer. Results were as follows:

| CONTROL SAMPLE | | | | | | | |
| --- | --- | --- | --- | --- | --- | --- | --- |
| λ, nm | 1500 | 1200 | 1100 | 1060 | 1000 | 800 | 600 |
| % Transmission | 83.6 | 88.3 | 88.4 | 88.2 | | 87.3 | 87.6 |
| COATED SAMPLE | | | | | | | |
| λ, nm | 1500 | 1200 | | 1060 | 900 | 700 | 600 |
| % Transmission | 88. | 92.3 | | 92.5 | 94.5 | 95. | 93 |

Of course, it will be understood by those skilled in this art the surface reflection loss from the control FR-5 glass is higher than from the average glass because of the high refractive index of the FR-5 glass.

EXAMPLE 4

Tetraethyl silicate (49.4 g) was mixed with isopropanol (50 g) and 1 N nitric acid solution (5 g) was added. The resulting solution was heated to approximately 60° C. and then allowed to cool to room temperature. Aluminum tri-sec-butoxide (6.3 g) was added and the mixture stirred until a clear solution was obtained.

Calcium nitrate tetrahydrate (8.2 g), sodium nitrate (1.9 g) and magnesium nitrate hexahydrate (11.7 g) were dissolved in 1 N nitric acid (40 g) and concentrated nitric acid (5 g). The solution was then added to the aluminosilicate solution and the resulting solution made up to a total weight of 200 g with isopropanol.

The product contained the equivalent of 20 g total oxides in 200 g total.

The composition of the above solution was such that, when heated to drive off volatiles and decompose the organic portions, the resulting glass composition is as follows:

| COMPONENT | WEIGHT PERCENT |
| --- | --- |
| $SiO_2$ | 71.2 |
| $Al_2O_3$ | 6.5 |
| CaO | 9.7 |
| MgO | 9.2 |
| $Na_2O$ | 3.4 |

This composition is diluted with 200 grams more of isopropanol and then used to coat fused silica and then decomposed and heat treated to form a phase-separated glass in a manner similar to Example 1. The coated sample is etched and leached with the same solution as in Example 1 to form an antireflective coating.

As will be evident to those skilled in the art, various modifications of this invention can be made or followed in the light of the foregoing disclosure and discussion without departing from the spirit and scope of the disclosure or from the scope of the claims.

We claim:

1. A process of making a glass article containing a thin surface film antireflective coating which comprises
    (1) providing a dispersion of organic derivatives of more than one inorganic cation, said dispersion containing at least one metallo-organic compound in solution in a liquid solvent, the components of said dispersion being capable of decomposition and reaction together under the influence of heat to form an inorganic oxide glass capable of phase separation into two immiscible phases on further heating,
    (2) depositing a thin coating of such dispersion on the glass article, heating the coating to drive off the solvent and to decompose the organic components, thus forming a glass film layer from the remaining inorganic oxide components, further heating the glass film layer to cause phase separation thereof into to immiscible phases, and thereafter etching and leaching such film to dissolve out preferentially one of the phases of the phase separated glass, leaving a skeletonized surface film having a graded refractive index.

2. A process according to claim 1 wherein the phase separated glass film layer is less than 0.5 mm thick.

3. A process according to claim 2 wherein the said glass film layer is less than 0.1 mm thick.

4. A process according to claim 1 wherein the said phase separated glass film layer is less than 1 micron thick.

5. A process of claim 2 wherein the thickness of said skeletonized surface film is less than that of the total glass film applied to the surface of said glass article according to said process.

6. A process of claim 3 wherein the thickness of said skeletonized surface film is less than that of the total glass film applied to the surface of said glass article according to said process.

7. A process of claim 4 wherein the thickness of said skeletonized surface film is less than that of the total glass film applied to the surface of said glass article according to said process.

8. A product of the process of claim 1 wherein the inorganic oxide glass of paragraph (1) has a composition different than the glass article of paragraph (2).

9. A product of the process of claim 7 wherein the inorganic oxide glass of paragraph (1) has a composition different than glass article of paragraph (2).

10. A process which comprises
    (1) providing a glass article and abrasively polishing at least one surface of said glass article,
    (2) providing a dispersion of organic derivatives of more than one inorganic cation, said dispersion containing at least one metallo-organic compound in solution in a liquid solvent, the components of said dispersion being capable of decomposition and reaction together under the influence of heat to form an inorganic oxide glass capable of phase separation into two immiscible phases on further heating,
    (3) depositing a thin coating of such dispersion on the glass article, heating the coating to drive off the solvent and to decompose the organic components, thus forming a glass film layer from the remaining inorganic oxide components, further heating the glass film layer to cause phase separation thereof into two immiscible phases, and thereafter etching and leaching such film to dissolve out preferentially one of the phases of the phase separated glass, leaving a skeletonized surface film having a graded refractive index, thus providing a glass article having an antireflective surface coating, and wherein the inevitable scratches on said base glass resulting from abrasive polishing are healed during the formation of the coating thereon of a phase-separable glass film layer.

* * * * *